United States Patent

[11] 3,625,409

[72] Inventors Nobuyuki Hisazumi;
 Masashi Ito; Takao Ichii, all of Iwaki-shi, Japan
[21] Appl. No. 878,027
[22] Filed Nov. 19, 1969
[45] Patented Dec. 7, 1971
[73] Assignee Kureha Kagaku Kogyo Kabushiki Kaisha
 Tokyo-to, Japan
[32] Priority Nov. 19, 1968
[33] Japan
[31] 43/84659

[54] VINYLIDENE CHLORIDE RESIN COMPOSITION AND CONTAINER STRUCTURES MANUFACTURED THEREFROM
 2 Claims, 1 Drawing Fig.
[52] U.S. Cl. .................................................... 229/3.5 R,
 150/0.5, 260/31.6
[51] Int. Cl. ....................................................... B65d 1/00,
 C08f 45/38
[50] Field of Search ............................................ 260/31.6;
 229/3.5 R

[56] References Cited
UNITED STATES PATENTS

| | | | |
|---|---|---|---|
| 2,555,062 | 5/1951 | Small et al. .................... | 260/31.6 |
| 2,624,716 | 6/1953 | Smith ............................ | 260/31.6 |
| 3,261,806 | 7/1966 | Gorsich ......................... | 260/31.6 |

FOREIGN PATENTS

| | | | |
|---|---|---|---|
| 623,743 | 5/1949 | Great Britain ................ | 260/31.6 |
| 1,129,626 | 10/1968 | Great Britain | |

*Primary Examiner*—Morris Liebman
*Assistant Examiner*—J. H. Derrington
*Attorney*—Wenderoth, Lind & Ponack ABSTRACT: A container structure for paste or high-viscosity liquid having stretch-oriented wall and improved shape-restitution property is manufactured from vinylidene chloride resin composition containing therein a particular polyester plasticizer such as a polyester produced by the reaction of succinic acid and ethylene glycol.

PATENTED DEC 7 1971
3,625,409
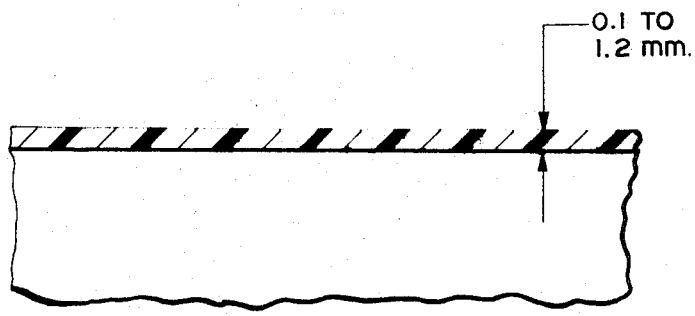
INVENTORS
NOBUYUKI HISAZUMI
MASASHI ITO
TAKAO ICHII
BY Wenderoth, Lind & Ponack
ATTORNEYS

VINYLIDENE CHLORIDE RESIN COMPOSITION AND CONTAINER STRUCTURES MANUFACTURED THEREFROM

BACKGROUND OF THE INVENTION

This invention relates to hollow container structures made of vinylidene chloride resin composition. More particularly, it relates to container structures of vinylidene chloride resins having a stretch-oriented wall of a thickness of from 0.1 to 1.2 mm., and an improved shape restitution when deformed by external forces. The improvement in the shape restitution is accomplished by adding high-molecular polyester plasticizers to vinylidene chloride resin material to be used for forming container structures.

As a method for producing container structures made of copolymer resins containing vinylidene chloride as the principal constituent, there is, for example, a method according to our Japanese Pat. No. 521,771 (U.S. Ser. No. 531,399, British Pat. No. 1,129,626, German Pat. application No. K 58,664, French Pat. No. 1,472,320, Italian Pat. No. 779,750). A container structure obtained by this method has a wall which is stretch-oriented in a biaxial direction and has high strength and very low oxygen permeability and vapor permeability. Accordingly, the container structure is usually employed for packaging or bottling of food products such as ketchup and mayonnaise which readily deteriorate due to oxidation.

Such a container structure, however, is inferior to one made of a polyethylene in its shape restitution properly after deformation. For example, when pressure is removed from the container structure which has been crushed under pressure during transportation, it is difficult for the crushed container structure to return or be restituted to its original shape. Accordingly, when a number of the container structure are being filled with contents such as ketchup or mayonnaise, the quantity of the contents charged into the container structures is not constant, and there occur frequent overflowing of the contents in spite of the intention to charge a specific constant quantity of the contents into each container structure.

In general, there are two cases of shape restitution or returning of a container structure made of plastics and having a flexible wall which has once been crushed. The one is that the container wall immediately returns to its original shape due to elasticity thereof when the external stress is removed, and the other is that the shape of the container is returned to its original state due to the weight of the contents at the time of its filling, which imparts pressure to the wall of the container.

When a liquid having a low viscosity such as water is charged into a hollow container structure having a thin and pliable wall, the filling of the container structure with this liquid can be successfully carried out with the original shape of the container due principally to the above latter restitution.

On the other hand, when a paste having a high viscosity, such as mayonnaise, is charged into a container made of vinylidene chloride and having a medium thickness of from 0.1 to 1.2 mm. if the container structure is in a crushed or pressed state, the pressing force against the wall of the container due to gravity is influenced by the viscosity of the paste or liquid, whereby the shape restitution force is weakened, and, further, the speed of the restitution becomes very slow. Accordingly, it is necessary in this case that the shape of the container be returned almost to its original state by its elasticity prior to filling with the contents and further that the shape be returned completely to the original state by the filling of the container.

Both of these two kinds of shape restitutions are influenced by temperature, being particularly poor at low temperatures. This disadvantage can be improved to some extent by the addition of a large quantity of antifreezing plasticizer to a vinylidene chloride resin composition. However, while the shape restitution property at the time of charging the contents into the container becomes progressively favorable with increase in the quantity of the plasticizer to be added to make the wall of the container pliable, excessive pliability gives rise to lowering in rigidity of the container structure at room temperature or higher whereby the shape-restituting property tends to deteriorate. Furthermore, when the quantity of an ordinary antifreezing plasticizer to be added to a vinylidene chloride resin composition is increased, the gas permeability of the container structure deteriorates, whereby the characteristic features of vinylidene chloride resin are lost.

SUMMARY OF THE INVENTION

It is the object of the present invention to provide a container structure having a stretch-oriented wall of a thickness of from 0.1 to 1.2 mm., and an improved shape-restitution property, which is obtained from a vinylidene chloride resin composition containing from 4 to 15 percent by weight of a polyester plasticizer having a mean molecular weight of from 500 to 4,000.

According to the present invention there is provided container structures each having a relatively high rigidity, excellent shape-restitution property due to elasticity and to internal pressure at the time of filling with a certain content, and very low oxygen permeability and being particularly useful for containers of liquid or paste food products which are easily oxidized.

DETAILED DESCRIPTION OF THE INVENTION

The polyester plasticizer to be added to the raw material of the vinylidene chloride resin composition of the present invention is a polymer which is produced from aliphatic dicarboxylic acid and polyol, is of a mean molecular weight of from 500 to 4,000, and contains therein hydroxyl or carboxyl groups or those obtained by esterification of these end groups.

That is, polyesters produced from dicarboxylic acids each having an alkyl group of a carbon content of $l$ and diols each having an alkyl group of a carbon content of $m$ are represented by the following general formulas (1), (2), and (3) depending on the ratios of the carboxylic acids and the polyols.

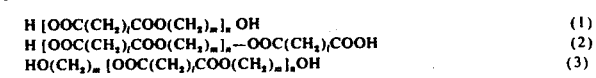

In the production of these polyesters, it is a general practice, when the end group is a carboxyl group, to cause a monohydric alcohol to react further with the carboxyl group, and when the end group is a hydroxyl group, to cause monocarboxylic acid to react with the hydroxyl group, thereby accomplishing esterification. A polyester employed for the present invention may be any one of the above polyesters.

As aliphatic dicarboxylic acids suitable for use in producing the polyesters of the present invention, there are, for example, succinic acid, glutaric acid, adipic acid, pimelic acid, suberic acid, azelaic acid, sebacic acid, undecanedioic acid, and dodecanedioic acid, or the isomers thereof, each of which has an alkyl group containing from two to 10 carbon atoms.

Example of polyols suitable for producing the polyesters of the present invention are isomers of diols, each having from two to eight carbon atoms such as ethylene glycol, propanediol, butanediol, pentanediol, hexanediol, heptanediol, octanediol, and etc.

Furthermore, as monohydric alcohols and monocarboxylic acids for esterifying the end groups of the polymers, those having an alkyl group containing from one to 18 carbon atoms are suitable.

A mean molecular weight of from 500 to 4,000 is suitable for the polyester employed for the present invention. In the case of a polyester plasticizer having a mean molecular weight of less than 500, the oxygen permeability of the container structure will increase, if the polyester is added to the vinylidene chloride resin composition by a quantity sufficient to obtain shape-restitution property of the container structure at

TABLE

| Sample No. | 1 | 2 | 3 | 4 | 5 | 6 | 7 |
|---|---|---|---|---|---|---|---|
| Resin, percent | 94 | 93 | 89 | 84 | 89 | 89 | 89 |
| Paraplex G-62 | 5 | 1 | 1 | 1 | 1 | 1 | 5 |
| DBS | 1 | 1 | 0 | 0 | 0 | 0 | 6 |
| Polyester | 0 | ABG-II 5 | ABG-II 10 | ABG-II 15 | PA-A-15 15 | PA-A-20 15 | 0 |
| Oxygen permeability, cc.-cm./cm.²/mm. Hg/sec. at 30° C | $4.5 \times 10^{-12}$ | $5.0 \times 10^{-12}$ | $5.5 \times 10^{-12}$ | $7.0 \times 10^{-12}$ | $6.0 \times 10^{-12}$ | $5.5 \times 10^{-12}$ | $10.0 \times 10^{-12}$ |
| Torsional rigidity: | | | | | | | |
| kg./cm.² at 20° C | $1.8 \times 10^3$ | $1.2 \times 10^3$ | $1.0 \times 10^3$ | $0.9 \times 10^3$ | $1.1 \times 10^3$ | $1.3 \times 10^3$ | $1.0 \times 10^3$ |
| Kc./cm.² at 0° C | $4.5 \times 10^3$ | $2.8 \times 10^3$ | $2.5 \times 10^3$ | $2.0 \times 10^3$ | $2.7 \times 10^3$ | $3.0 \times 10^3$ | $2.3 \times 10^3$ |
| Shape restitution property at the time of filling water: | | | | | | | |
| At (n=10) 20° C., cc | <185 | 190-200 | 200 | 200 | 200 | 200 | 200 |
| At 0° C., cc | <185 | 185-195 | 190-200 | 200 | 200 | 190-200 | 290-200 |
| Shape restitution property of empty container at (n=10) room temp | 1 | 3 | 4 | 4 | 4 | 3 | 2 |

Paraplex G-62 = Epoxidized vegetable oil plasticizer (trade name).
DBS = Dibutyl sebacate.
Polyester ABG-II = Polyadipic acid-butanediol-acetic ester; MW = 1,500 (Made by BASF Co.).
PA-A-15 = Polyadipic acid-propanediol-acetic ester; MW = 1,500 (Made by Daihachi Chemical Co.).
PA-A-20 = Polyadipic acid-propanediol-acetic ester; MW = 2,100 (Made by Daihachi Chemical Co.).

a low temperature, whereas in the case of a polyester having a mean molecular weight of more than 4,000, the shape-restitution property of the container structure will be poor.

Furthermore, in the vinylidene chloride resin composition of the present invention, less than 5 percent of modifying agents such as plasticizers other than the polyester plasticizers, stabilizers, etc. may be added to the composition depending on the necessity.

As other modifying agents, innoxious stabilizers such as 4-tert-butyl-salol and Tinuvin P may be employed, and as agents serving as stabilizer-cum-plasticizer, epoxy stabilizers may be also employed in the present invention. The total quantity of the polyester and modifying agent is within the range of from 3 to 20 percent by weight.

The raw material vinylidene chloride resin composition of the present invention is a copolymer composed of from 70 to 95 percent of vinylidene chloride and a monomer copolymerizable with vinylidene chloride such as vinyl chloride, acrylontrile, vinyl acetate, methyl methacrylate, methyl acrylate, ethylene, propylene, maleic acid, fumaric acid, itaconic acid, and other ethylene derivatives.

As circumstances require, less than 20 percent of other rubberlike resins such as ethylene-vinyl acetate copolymer, chlorinated polyethylene, and ABS resin may be admixed with the vinylidene chloride resin, in which case the resin content of the composition is adjusted within a range of from 80 to 97 percent by weight with respect to the total quantity of the composition.

The container structure of the present invention made of the vinylidene chloride resin composition to which the polyester plasticizer as mentioned above is added and mixed has a relatively high rigidity, excellent shape-restitution property due to its own elasticity and internal pressure at the time of filling of the container and a very low oxygen permeability, which is particularly useful for containing liquid or paste food products which are easily oxidizable.

In order to indicate still more clearly the nature and utility of the invention, the following specific example of practice constituting a preferred embodiment of the invention and results are set forth, it being understood that this example is presented as illustrative only, and that it is not intended to limit the scope of the invention.

EXAMPLE

A vinylidene chloride resin consisting of 80 percent by weight of vinylidene chloride and 20 percent by weight of vinyl chloride was employed to obtain mixture compositions shown in the following table. Each mixture composition was extruded from an extruder into a tubular shape and was immediately cooled with water to obtain an amorphous-tubing material. Each amorphous tubing was stretched from 1.1 to 2.5 times in its longitudinal direction. Each stretched tubing was clamped at both ends thereof in a metal mould to expand and draw so as to obtain a container structure having a biaxially stretch-oriented wall.

Each resulting container structure which had a volumetric capacity of 200 cc. and a wall thickness of 0.2 mm. was subjected to tests for oxygen permeability, torsional rigidity, shape restitution when filling with water, and shape restitution of the empty container. The results of these tests are indicated in the table.

The oxygen permeability of each structure was measured according to ASTM-D1434-58, the torsional rigidity was measured according to ASTM-D1043-51, and the rigidity was measured by the Clash-Berg method.

The shape restitution of the container structure when filled with water was measured by leaving empty container structures for about 1 hour at the temperatures of 5° and 20° C., respectively, charging into this container structure within 5 minutes 200 cc. of previously weighed water at a specific temperature, and then obtaining the average quantity of the water used to fill the container structures, while taking into consideration the shape restitution of the container structure itself and the shape restitution due to the internal pressure of the dead load of the water.

As the shape restitution of the empty container structure is also influenced by the shape of the container structure itself, the degree of restitution is as indicated in the table with numerals 1, 2, 3 and 4. The degree is in practice determined by pressing the container structure under external force at room temperature to deform it, while observing and judging the degree of restitution of the container structure when the external force is removed.

Since a factor influenced by the shape of the container structure is involved in the shape-restitution property of the empty container structure, in practice the container structure was crushed by an external force at room temperature to impart deformation thereto, and then the degree of restitution of the container structure was observed and judged when the external force was removed.

In the table, the numerical designations of the shape restitution respectively indicate the following results.

1. The case when the crushed container structure did not fully return to its original state.
2. The case when the crushed container structure did recover slightly, but the degree of the restitution was quite unfavorable for practical use.
3. The case in which the container structure under a slight deformation returned to its original state, but when it was subjected to a large deformation, its restitution was not adequate for practical use.
4. The case in which the container structure exhibited sufficient shape restitution against deformation both large and small at least at the step of filling the container structure with a liquid.

In the above table, sample Nos. 2 through 6, inclusive, designate container structures of the present invention, and sample Nos. 1 and 7 designate reference examples of the container structures which do not contain polyester plasticizers.

Since the container structure of sample No. 1 had very poor shape-restitution property, antifreezing plasticizer DBS was added to the resin composition, whereupon the shape-restitution property of the container structure became slightly favorable as the quantity of DBS increased, but the oxygen permeability of the container deteriorated remarkably.

On the other hand, however the container structure of sample Nos. 2 through 6, inclusive, according to the present invention were very satisfactory in oxygen permeability and shape-restitution property.

We claim:

1. A container structure made of a vinylidene chloride resin composition and having improved shape-restitution property, said container structure having a biaxially stretch-oriented wall of varying thickness ranging from 0.1 to 1.2 mm., said material vinylidene chloride resin composition composed primarily of a copolymer containing from 70 to 95 percent vinylidene chloride and containing therein at least one polyester plasticizer having a mean molecular weight of from 500 to 4,000 and selected from the group consisting of compounds represented by the following general formulas in an amount of 4 to 15 percent by weight:

$$H[OOC(CH_2)_lCOO(CH_2)_m]OH;$$

$$H[OOC(CH_2)_lCOO(CH_2)_m]_n-OOC(CH_2)COOH; \text{ and}$$

$$HO(CH_2)_m[OOC(CH_2)_lCOO(CH_2)_m]_nOH.$$

2. A container structure as claimed in claim 1 in which said polyester plasticizer is produced from at least one member selected from the group consisting of aliphatic dicarboxylic acids each having an alkyl containing from two to 10 carbon atoms, preferably succinic acid, glutaric acid, adipic acid, pimelic acid, suberic acid, azelaic acid, sebacic acid, undecanedioic acid, dodecanedioic acid, and isomers thereof and at least one member selected from the group consisting of diols each having from two to eight carbon atoms, preferably ethylene glycol, propanediol, butanediol, pentanediol, hexanediol, heptanediol, and octanediol.

* * * * *